(12) United States Patent
Arofikin

(10) Patent No.: US 11,064,718 B2
(45) Date of Patent: *Jul. 20, 2021

(54) STERILIZATION REACTOR

(71) Applicant: Millisecond Technologies Corp., New York, NY (US)

(72) Inventor: Nikolay V. Arofikin, Moscow (RU)

(73) Assignee: Millisecond Technologies Corp., New York, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/228,550

(22) Filed: Dec. 20, 2018

(65) Prior Publication Data

US 2019/0124954 A1 May 2, 2019

Related U.S. Application Data

(63) Continuation of application No. 13/800,100, filed on Mar. 13, 2013, now Pat. No. 10,194,680.

(51) Int. Cl.
| | |
|---|---|
| *A23L 3/00* | (2006.01) |
| *A23L 3/01* | (2006.01) |
| *A23L 3/015* | (2006.01) |
| *A23L 3/16* | (2006.01) |
| *A23C 3/037* | (2006.01) |
| *A23L 2/46* | (2006.01) |
| *B05B 15/62* | (2018.01) |
| *B05B 1/26* | (2006.01) |

(52) U.S. Cl.
CPC ............ *A23L 3/001* (2013.01); *A23C 3/0375* (2013.01); *A23L 2/46* (2013.01); *A23L 3/01* (2013.01); *A23L 3/0155* (2013.01); *A23L 3/16* (2013.01); *B05B 1/267* (2013.01); *B05B 15/62* (2018.02)

(58) Field of Classification Search
CPC ... A23L 3/001; A23L 2/46; A23L 3/01; A23L 3/0155; A23L 3/16; A23C 3/0375; B05B 15/62; B05B 1/267
USPC ................. 99/453, 470, 483, 471, 474, 516, 99/473–476, 534; 426/237, 521, 520, 426/522, 511, 453, 483, 516
See application file for complete search history.

(56) References Cited

U.S. PATENT DOCUMENTS

| | | | |
|---|---|---|---|
| 1,711,097 | A | 4/1929 | Kratzer |
| 1,819,023 | A | 8/1931 | Grindrod |

(Continued)

FOREIGN PATENT DOCUMENTS

| | | |
|---|---|---|
| CA | 2594134 | 3/2015 |
| CN | 2031204 U | 1/1989 |

(Continued)

OTHER PUBLICATIONS

PCT; International Search and Written Opinion dated Jul. 11, 2019 in International Application No. PCT/US2018/48008.

(Continued)

*Primary Examiner* — Phuong T Nguyen
(74) *Attorney, Agent, or Firm* — Snell & Wilmer L.L.P.

(57) ABSTRACT

A method and device to treat liquid to reduce the amount of microorganisms in the liquid to a preselected level and/or to mitigate the growth of microorganisms are disclosed. Utilizing the method or device, liquid product is sprayed into a cavity of a reactor using a nozzle that produces a flat spray to provide means for efficient heating and treatment of the liquid.

21 Claims, 4 Drawing Sheets

(56) References Cited

U.S. PATENT DOCUMENTS

Figure 1:
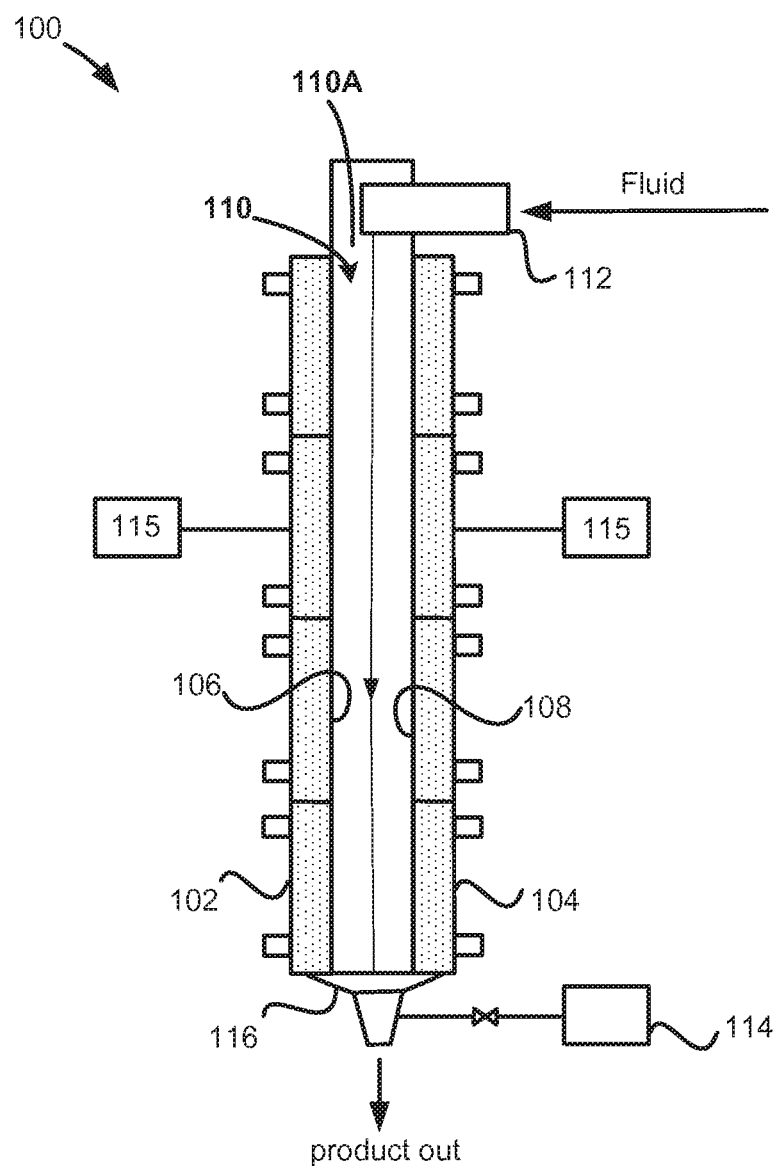

| | | |
|---|---|---|
| 2,052,967 A | 9/1936 | Fredrik |
| 2,374,805 A | 5/1945 | Camelford |
| 2,944,479 A | 7/1960 | Walsh et al. |
| 4,776,268 A | 10/1988 | Bronnert |
| 4,787,304 A | 11/1988 | Bronnert |
| 5,092,230 A | 3/1992 | Bronnert |
| 5,232,726 A | 8/1993 | Clark et al. |
| 5,914,255 A | 6/1999 | Grae |
| 6,251,341 B1 | 6/2001 | Zimmer |
| 6,471,914 B2 | 10/2002 | Platz et al. |
| 6,736,966 B2 | 5/2004 | Herrington et al. |
| 6,749,809 B2 | 6/2004 | Karasawa |
| 7,708,941 B2 | 5/2010 | Arofikin |
| 8,449,820 B2 | 5/2013 | Volkov et al. |
| 9,821,994 B2 | 11/2017 | McIntyre et al. |
| 10,194,680 B2 | 2/2019 | Arofikin |
| 2001/0038806 A1 | 11/2001 | Platz |
| 2002/0020675 A1 | 2/2002 | Herrington et al. |
| 2003/0035752 A1 | 2/2003 | Askenov et al. |
| 2004/0161363 A1 | 8/2004 | Lutzer |
| 2004/0170731 A1 | 9/2004 | Subramaniam |
| 2005/0121540 A1* | 6/2005 | Torigoe ............... A61H 33/063 239/289 |
| 2006/0199258 A1 | 9/2006 | Aksenov et al. |
| 2010/0322821 A1 | 12/2010 | Volkov |
| 2011/0171353 A1 | 7/2011 | Garwood |
| 2013/0302211 A1 | 11/2013 | Volkov et al. |
| 2014/0261017 A1 | 9/2014 | Arofikin |
| 2018/0092385 A1 | 4/2018 | Arofikin |

FOREIGN PATENT DOCUMENTS

| | | |
|---|---|---|
| CN | 1166124 A | 11/1997 |
| CN | 201888207 U | 7/2011 |
| CN | 107787188 | 3/2018 |
| FR | 2735039 | 12/1996 |
| GB | 413460 | 7/1934 |
| IL | 184161 | 3/2012 |
| JP | S5664771 | 3/1986 |
| JP | 01097459 | 4/1989 |
| JP | 2001346515 | 12/2001 |
| NZ | 707324 | 10/2018 |
| SU | 1745190 | 7/1992 |
| WO | 199732483 | 9/1997 |
| WO | 200056161 | 9/2000 |
| WO | 2001013772 | 3/2001 |
| WO | 2005042219 | 5/2005 |
| WO | 2007008618 | 1/2007 |
| WO | 2011143731 | 11/2011 |
| WO | 2014160020 | 10/2014 |
| WO | 2016172627 | 10/2016 |

OTHER PUBLICATIONS

MX; Notice of Allowance dated May 27, 2019 in Application No. MX/a/2015/012513.
IL; Office Action dated Mar. 6, 2019 in Application No. 241189.
JP; Final Office Action dated Mar. 25, 2019 in Application No. 2016-501927.
USPTO; Office Action dated Jun. 27, 2008 in U.S. Appl. No. 11/821,216.
USPTO; Office Action dated Feb. 19, 2009 in U.S. Appl. No. 11/821,216.
USPTO; Notice of Allowance dated Oct. 16, 2009 in U.S. Appl. No. 11/821,216.
USPTO; Notice of Allowance dated Jan. 28, 2010 in U.S. Appl. No. 11/821,216.
USPTO; Office Action dated Sep. 30, 2010 in U.S. Appl. No. 12/772,610.
USPTO; Office Action dated Jun. 30, 2011 in U.S. Appl. No. 12/772,610.
USPTO; Office Action dated Dec. 29, 2011 in U.S. Appl. No. 12/772,610.
USPTO; Office Action dated Sep. 12, 2012 in U.S. Appl. No. 12/772,610.
USPTO; Notice of Allowance dated Jan. 24, 2013 in U.S. Appl. No. 12/772,610.
USPTO; Requirement for Restriction dated Feb. 20, 2015 in U.S. Appl. No. 13/800,100.
USPTO; Office Action dated May 27, 2015 in U.S. Appl. No. 13/800,100.
USPTO; Final Office Action dated Sep. 21, 2015 in U.S. Appl. No. 13/800,100.
USPTO; Advisory Action dated Nov. 30, 2015 in U.S. Appl. No. 13/800,100.
USPTO; Office Action dated Apr. 27, 2016 in U.S. Appl. No. 13/800,100.
USPTO; Final Office Action dated Sep. 15, 2016 in U.S. Appl. No. 13/800,100.
USPTO; Requirement for Restriction dated Oct. 15, 2013 in U.S. Appl. No. 13/826,856.
USPTO; Office Action dated Jan. 14, 2014 in U.S. Appl. No. 13/826,856.
USPTO; Final Office Action dated Jun. 23, 2014 in U.S. Appl. No. 13/826,856.
USPTO; Office Action dated Nov. 4, 2014 in U.S. Appl. No. 13/826,856.
USPTO; Final Office Action dated Apr. 9, 2015 in U.S. Appl. No. 13/826,856.
USPTO; Notice of Allowance dated Oct. 3, 2018 in U.S. Appl. No. 13/800,100.
PCT; International Search Report dated Apr. 28, 2006 in Application No. PCT/IB2005/003879.
PCT; Written Opinion dated Apr. 26, 2006 in Application No. PCT/IB2005/003879.
PCT; International Preliminary Report on Patentability dated Jun. 26, 2007 in Application No. PCT/IB2005/003879.
PCT; Written Opinion and International Search Report dated Mar. 20, 2015 in Application No. PCT/US2014/025637.
PCT; International Preliminary Report on Patentability dated Apr. 22, 2016 in International Application No. PCT/US2016/029045.
PCT; International Search Report dated Apr. 22, 2016 in International Application No. PCT/US2016/029045.
PCT; International Written Opinion dated Apr. 22, 2016 in International Application No. PCT/US2016/029045.
AU; Office Action dated Jun. 15, 2017 in Application No. 2014244186.
AU; Notice of Acceptance dated Jun. 13, 2018 in Application No. 2014244186.
CN; Office Action dated Mar. 3, 2010 in Application No. 200580048538.9.
CN; Office Action dated Jul. 6, 2011 in Application No. 200580048538.9.
CN; Office Action dated Dec. 13, 2011 in Application No. 200580048538.9.
CN; Office Action dated Aug. 31, 2012 in Application No. 200580048538.9.
CN; Office Action dated Jan. 5, 2013 in Application No. 200580048538.9.
CN; Notice on Grant of Patent Right for Invention dated Jul. 4, 2013 in Application No. 200580048538.9.
CN; Office Action dated Dec. 29, 2016 in Application No. 201480026887.
CN; Office Action dated Oct. 18, 2017 in Application No. 201480026887.
CN; 3rd Office Action dated Apr. 11, 2018 in Application No. 201480026887.
IL; Office Action dated Jan. 25, 2011 in Application No. 184,161.
CA; Office Action dated May 3, 2012 in Application No. 2,594,134.
CA; Office Action dated Jan. 30, 2013 in Application No. 2,594,134.
EP; Office Action dated Apr. 23, 2018 in Application No. 14724546.8.
JP; Office Action dated Apr. 18, 2018 in Application No. 2016501927.
NZ; Office Action dated Jun. 2, 2017 in Application No. 707324.
NZ; 2nd Office Action dated Aug. 16, 2017 in Application No. 707324.

(56) References Cited

OTHER PUBLICATIONS

NZ; Notice of Allowance dated Jun. 2, 2018 in Application No. 707324.
Engineering Archives: Absolute, Gage, Vacuum and Atmospheric Pressures: pp. 1-2.
Vasquez-Caicedo et al., "High Pressure Stabilization of Wines: Impact of Pressure Change Technology on Wine Quality," Fraunhofer IGB (fraunhofer.eu), 1 page.
EP; Examination Report dated Nov. 7, 2019 in Application No. 14724546.8.
CA; Office Action Nov. 8, 2019 in Application No. 2,903,503.
JP; Office Action dated Dec. 3, 2019 in JP Application No. 2016-501927.
NZ; Examination Report dated Dec. 23, 2019 in Application No. 743173.
EP; Examination Report dated Jan. 2, 2020 in Application No. 16725955.5.
IN; Examination Report dated Jan. 6, 2020 in Application No. 9132/DELNP/2015.
CN; Fourth Office Action dated Jan. 14, 2019 in Chinese Application No. 201480026887.
AU; Examination Report dated Jul. 24, 2019 in Application No. 2018204275.
AU; Examination Report dated Aug. 20, 2019 in Application No. 2016250989.
BR; Preliminary Office Action dated Jul. 30, 2019 in Application No. 1120150227490.
CN; Notice on Grant of Patent Right for Invention dated Jul. 8, 2019 in Application No. 201480026887.
NZ; Office Action dated May 10, 2019 in Application No. 743173.
USPTO; Office Action dated Oct. 25, 2019 in U.S. Appl. No. 15/567,594.

* cited by examiner

## STERILIZATION REACTOR

CROSS-REFERENCE TO RELATED APPLICATIONS

This application is a continuation of, claims priority to and the benefit of, U.S. patent application Ser. No. 13/800,100, filed on Mar. 13, 2013 and entitled "STERILIZATION REACTOR AND METHOD PATENT APPLICATION," which is incorporated by reference in its entirety for all purposes.

FIELD OF THE INVENTION

The invention relates to systems and methods to reduce a number of microorganisms in a liquid; more particularly, the invention relates to systems and methods that use a change in liquid pressure and/or temperature to kill, or mitigate the growth of, microorganisms, such as bacteria. The system and method can be used for liquid products or substances in any industry, such as the food or pharmacological industries.

BACKGROUND OF THE INVENTION

There is a known method of liquid product thermal treatment intended to destroy or decrease the amount of harmful microorganisms (also referred to herein simply as microorganisms) wherein microorganisms are killed by mixing liquid product with a heating medium (e.g., sterile water steam) thereby heating the liquid product, and maintaining it at a temperature that ensures pasteurization or sterilization.

One drawback of this known method is that the liquid product mixes with water when steam condenses during the process of product cooling. This increases product mass on average by about 30% and as a result water removal is necessary. The water removal generally requires additional equipment, processing steps, time and expense. Another drawback of this known method is potential deterioration of product quality and taste after pasteurization due to destruction of vitamins and protein coagulation because of the temperature to which the product is raised.

Another known method with similar technical characteristics is one in which liquid product is mixed with a heating medium of condensing steam, and the liquid product is heated at a rate of about 1400° C./sec or more for pasteurization and about 7600° C./sec or more for sterilization to a temperature not exceeding the temperature at which qualitative changes in liquid product takes place (such qualitative changes and temperatures being known to those skilled in the art). The product is diffused into drops preferably not exceeding 0.3 mm in diameter (this process is described in Russian Patent No. 2,052,967, the disclosure of which that is not inconsistent with the disclosure herein, is incorporated by reference). This method promotes efficient thermal treatment of the liquid product, sufficiently kills microorganisms and does not adversely impact the qualitative aspects of the liquid product, because it increases the rate at which the liquid product is heated and only maintains the product at a high temperature for a short duration. The liquid product is heated only to a temperature lower than that which does not affect qualitative changes in the liquid product. This method is performed in a pasteurization device, which contains a liquid product diffuser, a pasteurization chamber, a nozzle for steam, a steam generator, a cooling chamber, and a vacuum pump.

A drawback of this method is that it does not exclude mixing of product with steam condensate, which can adversely impact the stability of organoleptic and physicochemical properties (such as taste, odor, color and consistency) of such liquid products, which include, for example, non-frozen concentrate ("NFC") juices and dairy products, and it does not guarantee the necessary destruction of microorganisms that are heat resistant.

SUMMARY OF THE INVENTION

The purpose of the invention is to create an efficient liquid product pressure and/or temperature treatment method and device that promotes organoleptic and physicochemical stability of liquid products. It has been discovered that providing a flat stream (or "flat spray") of liquid between substantially parallel, heated surfaces of an interior cavity of a reactor increases the efficacy and throughput of the treatment method and system, and overall operational costs are reduced as compared to related devices and methods.

In accordance with various embodiments of the invention, a reactor for sterilizing, treating, pasteurizing, and/or otherwise reducing the number of microorganisms in a liquid, such as a liquid food substance, includes an interior cavity that is preferably defined by two substantially parallel surfaces (as used hereafter, the term "parallel" means substantially parallel), an entrance to the interior cavity, one or more heating sources for each of the parallel surfaces, and a nozzle at the entrance of the interior cavity to provide a flat spray of the liquid into the interior cavity between the parallel surfaces. The parallel surfaces and interior cavity are preferably vertically oriented so the liquid spray remains substantially between the surfaces during a treatment process. The reactor may also include a pump for lowering the pressure in the interior cavity, and one or more ports for introducing a heating medium (such as steam or hot air).

A reactor according to aspects of the invention may include more than two heated, parallel surfaces. In that case, an inner cavity may be defined between each two adjacent parallel surfaces, and at least one nozzle that produces a flat stream of liquid located at the entrance of each interior cavity. In accordance with various aspects of these embodiments, the interior surfaces are preferably orientated in a vertical configuration, such that the flat spray of liquid moves inside the interior cavity in between and substantially parallel to the inner surfaces. In accordance with further aspects, one or more nozzles introduce a flat spray into each entrance, and preferably into the center of each inner cavity.

A reactor according to the invention may further include a reservoir to collect the treated liquid. In a preferred embodiment, the reservoir is at the bottom of the reactor.

Further, another aspect of the invention is a nozzle that converts a generally cylindrical stream of fluid into a flat stream. The nozzle preferably includes an interior structure (e.g., a flat, disc-shaped plate) to convert the stream from a cylindrical or conical stream to a flat spray that enters the interior cavity between the parallel inner surfaces. In a particularly preferred embodiment the cylindrical stream of liquid flows in one direction and is converted to a flat stream traveling in another direction.

In accordance with additional embodiments of the invention, a process for treating (e.g., pasteurizing, sterilizing or otherwise reducing the number of microorganisms in) a liquid, such as a liquid food substance, includes providing a reactor having a cavity preferably between two parallel surfaces, creating a vacuum within the cavity, heating the two parallel surfaces, and introducing a flat spray of liquid into the cavity between the parallel surfaces. In accordance with exemplary aspects of these embodiments, the two parallel walls are heated to substantially the same temperature in order to uniformly heat the liquid passing through the inner cavity. In accordance with further aspects, the pressure drop of the liquid entering the nozzle to the liquid entering the interior cavity preferably varies between about $10^5$ Pa/sec to $10^{10}$ Pa/sec. In accordance with yet further aspects, the process preferably includes diffusing the liquid into drops (preferably into drops not exceeding about 0.3 mm in diameter) and exposing the liquid to a speed of pressure variation of about $10^5$ Pa/sec, or $10^5$ Pa/sec to $10^{10}$ Pa/sec, or about $10^{10}$ Pa/sec, or more. In accordance with further aspects, the speed of the drops exiting the nozzle may be about $10^5$ m/sec or more and the pressure drop occurs during diffusion of the liquid into the inner cavity as it exits the nozzle. The liquid is diffused utilizing the nozzle and may be maintained at one pressure on one side of the nozzle (the pressure being measurable and controllable, preferably by using a pump) and is released when the liquid diffused into the inner cavity on the other side of the nozzle. The pressure inside the reactor may also be regulated and, if it is, the pressure may be regulated by the use of a vacuum pump.

In accordance with various aspects of the exemplary device and method set forth herein, the liquid product may be exposed to additional heating. If so, the additional heating may be performed in the reactor cavity or chamber as the liquid product is diffused and can be done utilizing superheated steam or any other suitable heating method or medium (other options include ultrasonic frequency, infrared light and hot air). If steam or another medium is used it may be introduced into the chamber through a separate port and delivered in the same direction as the liquid product, or in the opposite direction, or any direction. Further, the rate of heating the liquid product preferably does not exceed 1100° C./sec, but any rate of heating can be utilized that sufficiently kills the required number of microorganisms and that does not heat the liquid product to a temperature at which its qualitative attributes are adversely affected.

In another embodiment, the interior chamber is maintained at a temperature of between about 48° C. and 82° C., and preferably between about 50° C.-75° C., and most preferably from about 56° C.-72° C. Such temperatures are most preferably below the heat required for HTST pasteurization of a liquid. In preferred embodiments, the temperature of the liquid before it enters the nozzle is about 10° C.-20° C. less than the temperature of the liquid when it enters the interior cavity.

An embodiment of the invention also includes a nozzle for converting a high-pressure cylindrical or conical stream of liquid flowing in a first direction to a flat stream of the liquid flowing in a second direction. The nozzle includes an inlet at a first end, a tapered end, a conduit therebetween, and an interior structure proximate the tapered end, the interior structure being generally flat and including a cutout to form a flat spray of liquid received from the tapered end. The second direction may be perpendicular to the first direction.

The invention provides a highly efficient, cost effective treatment method and device without significant changes in their organoleptic or physicochemical features.

BRIEF DESCRIPTION OF THE DRAWING FIGURES

The exemplary embodiments of the present invention will be described in connection with the appended drawing figures, in which:

FIG. 1 illustrates a reactor for treating a liquid in accordance with exemplary embodiments of the disclosure;

FIG. 2 illustrates a portion of the reactor illustrated in FIG. 1;

FIG. 3 illustrates a nozzle for use in treating a liquid in accordance with additional embodiments of the invention; and FIG. 4 illustrates a method of treating a liquid in accordance with additional embodiments of the invention.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF PREFERRED EMBODIMENTS

The description of exemplary embodiments of the present invention provided below is merely exemplary and is intended for purposes of illustration only; the following description is not intended to limit the scope of the invention disclosed herein.

As set forth in more detail below, an exemplary reactor and method can be used to treat a liquid, such as a food substance, to pasteurize, sterilize or otherwise reduce the amount of microorganisms in a liquid in a cost-effective and efficacious manner. The reactor and process have a relatively high throughput compared to similar treatment devices and processes, because the device and process described herein are configured to efficiently heat a flat stream of liquid. By making the reactor walls flat and creating an interior cavity between them, many more interior cavities can be formed within a given volume than with previous reactors, which are generally large, open vessels. Further, because the inner surfaces of the reactor preferably are substantially parallel and a flat spray of liquid to be treated is preferably introduced between them, the heat from the inner surfaces more efficiently heat the liquid. As an example if a current reactor has a volume the size of a room, numerous reactors according to aspects the invention could fit into the same space, and significantly more liquid could be treated over a given period of time in the same amount of space.

The reactor and method described herein may be used to treat a variety of liquids and may be particularly well suited for the treatment of food substances, such as dairy, non-frozen concentrate juices, and the like. As used herein "flat stream" or "flat spray" means a spray that is substantially planer. By way of examples, the spray may be substantially planer in a first direction and an angle of the spray in a direction perpendicular to the first direction may be about twenty degrees or less, about ten degrees or less, about five degrees or less or about two degrees or less. The spray is preferably about 5 mm to 30 mm thick.

FIG. 1 illustrates a reactor 100 in accordance with exemplary embodiments of the disclosure. As shown, the walls, surfaces and interior cavity of this embodiment are vertically oriented. Reactor 100 as shown includes two heated, parallel surfaces 102, 104, a heating source and a nozzle 112. Reactor 100 may include additional walls, not illustrated, to form an interior cavity 110 within the reactor. The interior cavity may be hermetically sealed. Reactor 100 may also optionally include a reservoir 116 to collect the liquid. Reactor 100 may additionally include one or more ports to introduce steam or other heated fluid, such as air, to interior cavity 110. Optionally, it may also include a vacuum source 114, which is preferably a vacuum pump.

During operation of reactor 100, pressurized liquid is introduced to an entrance of reactor 100, e.g., near or at the top of reactor 100, via nozzle 112, and the liquid is projected downward as a flat spray between the inner surfaces 106, 108, respectively, of walls 102, 104. As the liquid enters interior cavity 110, the liquid undergoes a rapid change in pressure and/or temperature. The liquid is preferably heated via radiant heat from surfaces 106, 108. Providing a flat spay of liquid to interior cavity 110 allows rapid heating of the liquid, which reduces or eliminates the need for any additional heated fluid, such as air or steam, to be added to heat the liquid. Because less or no additional fluid is required to heat the treated liquid, as compared to other systems that use steam, less capital investment is required to treat the liquid, because less water would have to be removed from the treated liquid if it were heated using steam.

Although not illustrated, a system including reactor 100 may include an additional optional heat source, such as a steam generator, a hot air source, infrared radiation or any other suitable heating method. An exemplary system including an additional heat source and a cooling chamber is disclosed in U.S. Pat. No. 7,708,941, the contents of which are hereby incorporated herein by reference, to the extent such contents do not conflict with the present disclosure.

Referring again to FIG. 1, each wall 102, 104 has an interior surface, 106, 108, respectively. An interior cavity 110 between interior surfaces 106, 108 defines at least part of an interior cavity within reactor 100. Walls that are heated and/or walls that are not heated may define any remaining portion of interior cavity 110. The walls may be coupled together using any suitable technique, such as welding, or the walls may be integrally formed. By way of one example, walls 102, 104 may have dimensions of 1200 mm×1200 mm and a spacing between the walls may be about 60 mm. Walls 102, 104 may be formed of any suitable material, such as stainless steel and have any suitable dimension or space between them.

In the illustrated example, wall 102 and wall 104 are vertical and the liquid to be treated travels from an entrance between walls 102, 104 downward towards the bottom of the reactor 100 and may be collected in reservoir 116. Because the liquid preferably travels in a substantially vertical direction, it tends to remain in the center of the inner cavity and be evenly heated.

In another embodiment not illustrated, the walls may not be parallel, but may be in the shape of an inverted "V," with them being closest at the top where the flat liquid spray is introduced. Alternatively, they could be formed in a "V" shape with them being farthest apart at the top where the flat liquid spray is introduced.

Interior surfaces 106, 108 of walls 102, 104 may be heated to the same or different temperatures using a variety of techniques. For example, walls 102, 104 may be heated using one or more heating elements, such as heating jackets (e.g., steam or other heated fluid jackets) around one or more of an exterior or interior of the walls. Alternatively, walls 102, 104 may be heated using electric heat or by having heated fluid pass through an interior portion of the walls. In accordance with exemplary embodiments of the invention, walls 102, 104 are heated to a temperature of about 150° F.-200° F., although they may be heated to any suitable temperature.

Although reactor 100 is illustrated with two parallel, vertical walls, a reactor in accordance with the present invention may have greater than two walls and a plurality of interior cavities, one being between every two wall surfaces. Each interior cavity defined by two wall surfaces may have one or more nozzles at the entrance to the cavity, such that the flat stream exiting the one or more nozzles is projected substantially into the center of the interior cavity, equaldistant from each wall surface.

Figure 2:
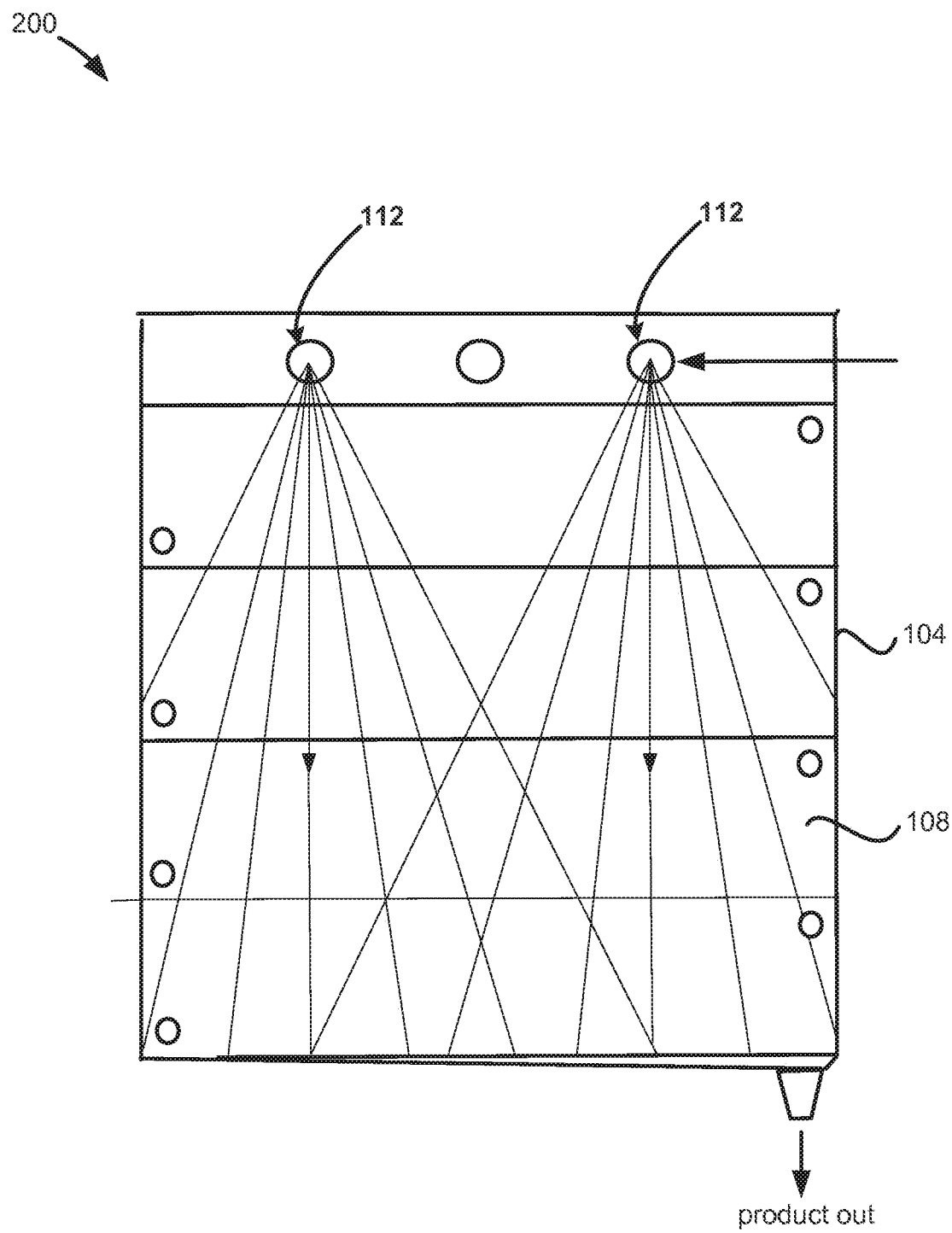
Figure 3:
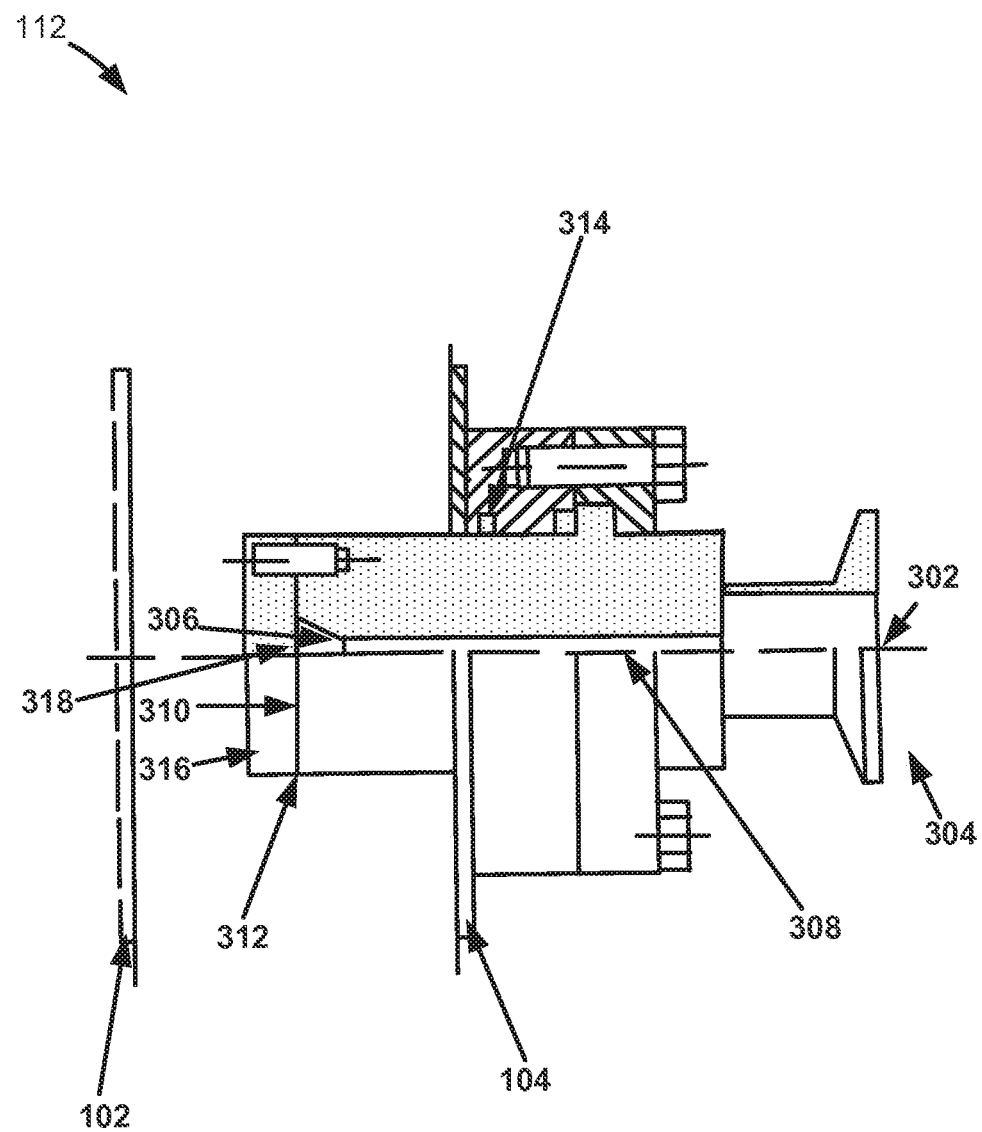

Nozzle 112 is located at an entrance to interior cavity 110. Nozzle 112 converts an incoming stream of liquid (e.g., a cylindrical or conical stream) flowing in a first direction to a flat stream flowing in a second direction. In the illustrated example, the second direction is perpendicular to the first direction. FIG. 3 illustrates exemplary nozzle 112 in greater detail. Nozzle 112 includes an inlet 302 at a first end 304, a tapered end 306 at an end of a conduit 308 between first end 302 and tapered end 306. Inlet 302 and conduit 308 may have a diameter between about 1 and 3 mm. Nozzle 112 also includes an interior structure 310 that receives liquid from conduit 308 or tapered end 306 (e.g., in a cylindrical or conical pattern) and converts the liquid to a flat spray pattern, as illustrated in FIG. 2, which exits at end 312 of interior structure 310. The thickness of the flat spray exiting the nozzle may be no more than 5 mm, no more than 10 mm, no more than 20 mm, or no more than 30 mm.

Interior structure 310 may include, for example, a flat plate, which may be in the shape of a disc. Interior structure 310 includes a leading edge 318 distal to end 312. In accordance with exemplary aspects of these embodiments, the pressure change from the leading edge to the trailing edge is at least about $10^5$ Pa/sec to $10^{10}$ Pa/sec. The volume of the liquid exiting nozzle 112 may be, for example, between about 500 l/hr to 1000 l/hr or more. Nozzle 112 may be formed of any suitable material, such as food-grade stainless steel.

Nozzle 112 may be attached to one or more walls 102, 104 using any suitable technique. By way of example, nozzle 112 may include a gasket ring 314, a clamping disc 316, and a fastening mechanism, such as a screw 318 to secure nozzle 112 to wall 104. Nozzle 112 may be fastened, such that spray from nozzle 112 is centered between the surfaces 106, 108, respectively, of walls 102 and 104, as illustrated in FIGS. 1-2.

In accordance with exemplary embodiments of the invention, nozzle 112 is designed to create drops having a diameter generally not exceeding about 0.3 mm (although it is possible that some drops would exceed this diameter even in the preferred embodiment). A speed of the drops in reactor may be about 10 m/sec or more, although this may vary according to desired operating parameters.

Vacuum source 114 may include any suitable vacuum pump. Vacuum source or pump 114 may be configured to maintain a pressure in interior cavity 110 of any suitable amount, and preferably from below one atmosphere to about 0.25 Pa. The pressure in interior cavity 110 is selected to maintain a rapid pressure drop per time to kill microorganisms when the liquid exits the nozzle and enters the interior cavity.

The pressure differential rate to which liquid is subjected can vary widely. For example, the pressure differential rate may be about $10^5$ Pa/sec or more or about $10^9$ Pa/sec or more, or between $10^5$ Pa/sec to $10^{10}$ Pa/sec. To provide a desired pressure differential, liquid entering nozzle 112 may be pressurized.

Figure 4:
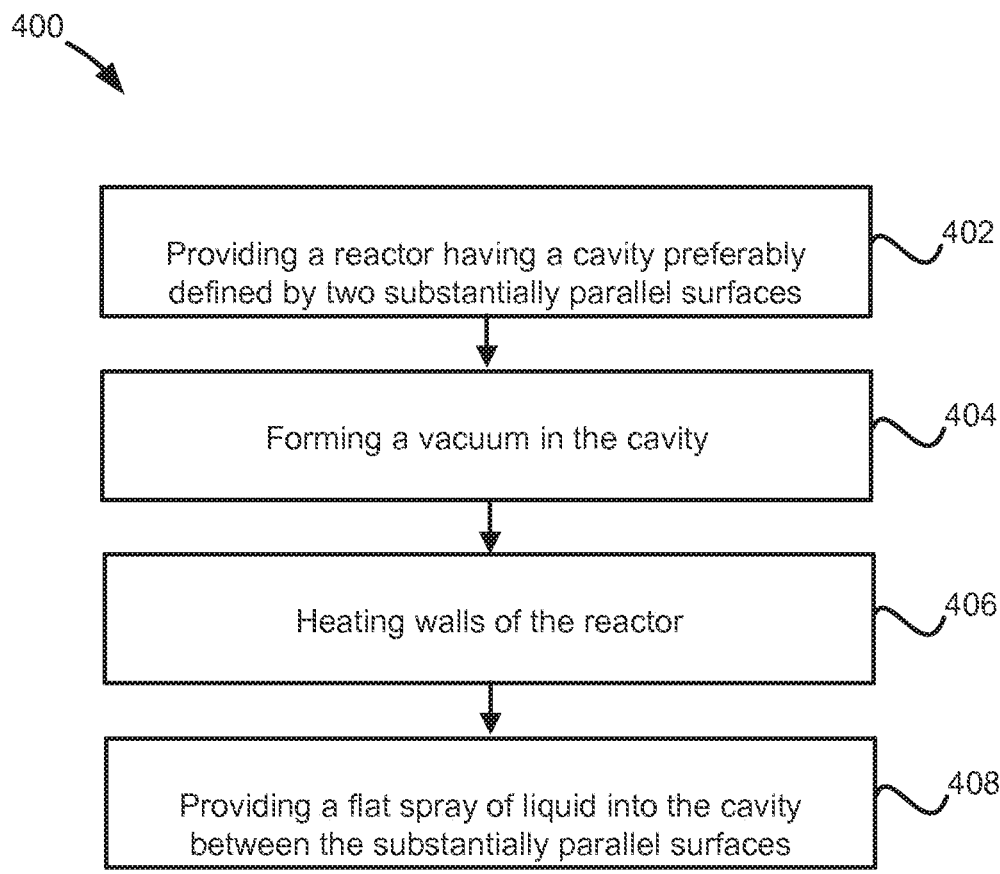

FIG. 4 illustrates a method 400 of treating a liquid in accordance with additional embodiments of the invention. Method 400 includes the steps of providing a reactor having cavity between two parallel walls (step 402), heating each of the two parallel walls (step 406), and introducing a flat spray of liquid (e.g., liquid food product) into the cavity (step 408). Although not illustrated, method 400 may also include creating a vacuum in the interior cavity, treatment of the liquid product with chemically active gases, or components, or substances, such as one or more chemically active gases including one or more of the group consisting of oxygen, chlorine and fluorine that kill bacteria.

Step 402 include the step of providing a reactor having at least two parallel walls. The reactor may be reactor 100, as described above, and may include more than two parallel walls.

In step 406, the parallel walls of the reactor are heated. As noted above, the walls may be heated by, for example, using one or more heating jackets around one or more of an exterior or interior of the walls, or they may be heated in any other suitable manner such as by passing hot fluid through the interior.

During step 408, a flat spray of the liquid is introduced into the cavity. The liquid may enter the nozzle at about 10° C. to about 100° C. or about 50° C. to about 75° C. and the liquid product may be diffused into drops having a diameter generally not exceeding about 0.3 mm (although it is possible that some drops would exceed this diameter even in the preferred embodiment). The liquid may also be pressurized at a first end of the nozzle prior to entering the cavity. The rate of pressure variation in combination with the heat from the walls is sufficient to kill preselected microorganisms or reduce a number of microorganisms to a predetermined level, which is often required by a governmental standard. The rate of pressure change to which liquid is subjected can vary widely, and preferred rates of pressure change are mentioned above. The preferred speed of the drops in the cavity is also mentioned above and varies according to desired operating parameters.

Steps according to the method may be performed in any order suitable to desired end product.

The liquid is heated to a temperature that does not lead to its qualitative changes, such temperatures being specific to each liquid product and being known to those skilled in the art.

Although not illustrated, method 400 may include an additional step of adding heated fluid, such as air or steam, to the interior cavity to further heat the liquid being treated. If heating in addition to the heated walls is used, the liquid may be heated using super-heated water steam or hot air. Additionally or alternatively, if additional heat is applied to the liquid, the liquid could be heated using any other suitable method, such as infrared light or ultrasonic frequency.

The treated liquid together with any steam that may have been used may be sent to a cooling chamber where any excess water may be removed with the help of a condenser and a vacuum pump, which is known in the art, and the liquid product is cooled down to a desired temperature.

The use of the invention provides for microbiological stability of the treated liquid product while preserving qualitative properties of the liquid product at its original levels or close to the original levels. This is an important feature for the industrial production of liquid products such as milk, juices (such as reconstituted juices or NFC juices), nectars and other products.

Additionally, after treatment utilizing a device and method according to the invention, the treated liquid may be treated a second time utilizing a standard pasteurization or sterilizing method.

Following are exemplary combinations of elements of aspects of the invention:

1. A reactor for sterilizing a liquid food product, the reactor comprising:
   (a) an interior cavity;
   (b) an entrance to the interior cavity;
   (c) at two spaced-apart walls wherein each wall has an interior surface, and a space between the interior surfaces, the space defining part or all of the interior cavity;
   (d) one or more heating elements that heat each of the interior surfaces of the walls; and
   (e) a nozzle at the entrance, the nozzle having an inlet into which the liquid food product enters and an exit opening to the interior cavity and through which the liquid food product enters the cavity, the nozzle projecting a flat stream of the liquid into the interior cavity.
2. The reactor of example 1 wherein the interior surfaces of the walls are parallel.
3. The reactor of example 2 wherein the parallel interior surfaces of the walls are vertically oriented.
4. The reactor of examples 1-3 wherein the nozzle is centered between the interior surfaces of each wall.
5. The reactor of any of examples 1-4 wherein the entrance is at the top of the reactor and the flat spray is directed downward.
6. The reactor of any of examples 1 or 4 wherein the interior surfaces are not parallel.
7. The reactor of example 6 wherein the inner surfaces are vertically oriented.
8. The reactor of example 7 wherein the inner surfaces are closer together at the top than at the bottom.
9. The reactor of example 7 wherein the inner surfaces are closer together at the bottom than at the top.
10. The reactor of any of examples 1-9 that includes a plurality of interior surfaces with an interior cavity defined between each of the interior surfaces and a nozzle at the entrance of each interior cavity.
11. The reactor of example 10 wherein there is a plurality of nozzles, and at least one nozzle is centered between each interior cavity.
12. The reactor of example 11 wherein each nozzle is at an entrance at the top of the reactor and the nozzle projects flat spray downward into the interior cavity.
13. The reactor of example 11 wherein at least one of the plurality of nozzles is centered between each interior cavity.
14. The reactor of any of examples 1-13 further comprising a reservoir at the bottom of the reactor to collect the liquid.
15. The reactor of example 1 that includes one or more ports to introduce steam or hot air into the interior cavity.
16. The reactor of example 3 that includes one or more ports to introduce steam or hot air into the interior cavity.
17. The reactor of example 10 that includes one or more ports to introduce steam or hot air into each of the interior cavities.
18. The reactor of any of examples 1-17 wherein each interior surface is heated to between 160° F. and 200° F.
19. The reactor of any of examples 1-18 wherein the temperature of each interior cavity is between 48° C. and 82° C.
20. The reactor of any of examples 1-18 wherein the temperature of each interior cavity is between 50° C. and 72° C.
21. The reactor of any of examples 1-18 wherein the temperature of each interior cavity is below the pasteurization temperature of the liquid.
22. The reactor of any of examples 1-21 wherein the liquid pressure changes at a rate of between $10^5$ to $10^{10}$ Pa/sec as the liquid moves through the nozzle and into the interior cavity.

23. The reactor of any of examples 1-21 wherein the liquid pressure changes at a rate of between $10^9$ Pa/sec or more as the liquid moves through the nozzle and into the interior cavity.
24. The reactor of any of examples 1 to 23 wherein the liquid spray is in droplets of 0.3 mm in diameter or less.
25. The reactor of any of examples 1-24 wherein the speed of the liquid spray is $10^3$ m/sec or more.
26. The reactor of any of examples 1-25 wherein the liquid is heated before entering the nozzle.
27. The reactor of any of examples 1-26 wherein the heating rate of liquid product exiting the nozzle does not exceed 1100° C./sec.
28. The reactor of any of examples 1-27 wherein the nozzle comprises a cavity, a nozzle in fluid communication with the cavity, the nozzle for creating a flat spray from a cylindrical or conical stream of liquid, a vacuum control unit in communication with the cavity, wherein the vacuum control unit and nozzle create a pressure change in the liquid product entering the inner cavity.
29. The reactor of any of examples 1-28 wherein the temperature of the liquid entering the nozzle is 10° C.-20° C. less than the liquid exiting the nozzle.
30. The reactor of any of examples 1-29 wherein the nozzle is attached to a wall whose inner surface helps define the inner cavity.
31. The reactor of any of examples 1-30 wherein the nozzle includes an inlet, a central portion and an outlet offset at a 45°-90° angle from the inlet.
32. The reactor of examples 30-31 wherein the nozzle includes an interior structure that comprises a flat plate that converts a generally cylindrical stream of liquid into a flat spray.
33. A nozzle for use in a reactor for sterilizing liquid, the nozzle including an inlet, an interior structure that comprises a flat plate that converts a cylindrical stream into a flat spray, and an outlet formed at an angle offset from the inlet.
34. The nozzle of example 33 wherein the flat plate is disk shaped.
35. A process for sterilizing a liquid food product, the process including the steps of:
    (a) providing a reactor having a cavity between two parallel walls;
    (b) creating a vacuum in the cavity;
    (c) heating each of the two parallel walls; and
    (d) introducing a flat spray of the liquid food product into the cavity.
36. The process of example 35 wherein each of the two parallel walls are heated to the same temperature.
37. The process of example 35 wherein the vacuum is 0.25 Pa.
38. The process of example 35 wherein the liquid food product is pressurized before being released into the cavity.
39. The process of example 35 wherein the spray is in droplets.
40. The process of example 35 wherein the liquid food product is converted form a cylindrical or conical stream into a flat spray prior to being introduced into the cavity.
41. A liquid product treatment method wherein the liquid product is diffused into a cavity of a reactor from a flat spray while the speed of pressure change in the liquid is sufficient to reduce the level of preselected microorganisms to a predetermined level.
42. The process of example 35 wherein the speed of pressure change in the liquid product is approximately $10^5$ Pa/sec or more.
43. The process of example 39 wherein the speed of the droplets is about 10 m/sec or more.
44. The process of example 35 further comprising the step of heating the liquid product using a plurality of vertical heated walls.
45. The process of example 35 wherein the heating step is performed at pressure lower than ambient pressure.
46. The process of example 35 further comprising the step of adding a heated fluid to the liquid product.
47. The process of example 35 wherein the heating rate of the liquid product does not exceed 1100° C./sec.
48. A device for implementation of a liquid product pressure treatment method, the device comprising a cavity, a nozzle in fluid communication with the cavity, the nozzle for creating a flat spray from a cylindrical or conical stream of liquid, a vacuum control unit in communication with the cavity, wherein the vacuum control unit and nozzle create a pressure change in the liquid product entering the chamber of $10^5$ Pa/sec or more, and two or more heated walls that heat the liquid as the liquid enters the cavity.
49. The device of example 48 further comprising a cooling chamber.
50. The device of example 49 wherein the wall comprise stainless steel.
51. The device of example 50 wherein the nozzle is comprised of stainless steel.
52. The reactor of example 1 wherein the nozzle has an outlet diameter of between 1 mm and 3 mm.
53. The process of example 28 further comprising the step of treating the liquid product with chemically active gases, or components, or substances that kill bacteria.
54. The process of example 53 wherein the one or more chemically active gases comprise one or more of the group consisting of oxygen, chlorine and fluorine.

The present invention has been described above with reference to a number of exemplary embodiments and examples. It should be appreciated that the particular embodiments shown and described herein are illustrative of the exemplary embodiments of the invention, and are not intended to limit the scope of the invention. It will be recognized that changes and modifications may be made to the embodiments described herein without departing from the scope of the present invention. These and other changes or modifications are intended to be included within the scope of the claimed invention and the legal equivalents thereof.

What is claimed is:
1. A reactor for sterilizing a liquid, the reactor comprising:
   two spaced-apart walls comprising a first wall having a first interior surface and a second wall having a second interior surface, and an interior cavity between the first interior surface and the second interior surface;
   an entrance to the interior cavity;
   one or more heating elements that are configured to maintain the temperature of the interior cavity at 48° C. to 82° C.; and
   a nozzle having an inlet into which the liquid enters and an exit opening to the interior cavity and through which the liquid enters the interior cavity, the nozzle configured to project a flat stream of the liquid into the interior cavity between the first interior surface and the second interior surface.
2. The reactor of claim 1, wherein the first interior surface is planar, and the second interior surface is planar.

3. The reactor of claim 1, wherein the first interior surface is parallel to the second interior surface.

4. The reactor of claim 1, wherein the nozzle is centered between the first interior surface and the second interior surface.

5. The reactor of claim 3, wherein the nozzle is configured to project the flat spray downward.

6. The reactor of claim 1, wherein the reactor has a top and a bottom, and the first interior surface is closer to the second interior surface at the top than at the bottom.

7. The reactor of claim 1, wherein the reactor has a top and a bottom, and the first interior surface is closer to the second interior surface at the bottom than at the top.

8. The reactor of claim 1 that further includes a third wall having a third interior surface and a second interior cavity is defined between the third interior surface and an outer surface of the second wall, and that also further includes a second nozzle having an inlet into which the liquid enters and an exit opening to the second interior cavity and through which the liquid enters the second interior cavity, the second nozzle configured to project a flat stream of the liquid into the second interior cavity between the third interior surface and the outer surface of the second wall.

9. The reactor of claim 8, wherein the second nozzle is centered between the third interior surface and the outer surface of the second wall.

10. The reactor of claim 1 that further comprises a reservoir at the bottom of the reactor to collect the liquid.

11. The reactor of claim 1 that further includes one or more ports configured to introduce steam or hot air into the interior cavity.

12. The reactor of claim 1 that is configured to heat the first interior surface and the second interior surface to between 160° F. and 200° F.

13. The reactor of claim 1 that is configured to change the pressure of the liquid at a rate of between $10^5$ to $10^7$Pa/sec as the liquid moves through the nozzle and into the interior cavity.

14. The reactor of claim 1 that further includes a heater outside of the interior cavity, the heater configured to heat the liquid before the liquid enters the nozzle.

15. The reactor of claim 1, wherein the nozzle is configured to create the flat stream from a cylindrical or conical stream of liquid that enters the inlet.

16. The reactor of claim 1 that further includes a vacuum control unit in communication with the interior cavity, wherein the vacuum control unit is configured to create a pressure change in the liquid entering the interior cavity.

17. The reactor of claim 1, wherein the nozzle is attached to the first wall or the second wall.

18. The reactor of claim 1, wherein the nozzle includes an inlet, a central portion and an outlet offset at a 45°-90° angle from the inlet.

19. The reactor of claim 1, wherein the nozzle includes an interior structure that comprises a flat plate that converts a generally cylindrical stream of liquid into a flat spray.

20. The nozzle of claim 19, wherein the flat plate is disk shaped.

21. The reactor of claim 1 that further includes heating elements external to the interior cavity.

* * * * *